Nov. 8, 1932.   E. D. T. NORRIS   1,887,461
LIGHTNING OR SURGE ABSORBER
Filed Oct. 19, 1929   2 Sheets-Sheet 1

Nov. 8, 1932.  E. D. T. NORRIS  1,887,461
LIGHTNING OR SURGE ABSORBER
Filed Oct. 19, 1929  2 Sheets-Sheet 2

E. D. T. Norris
INVENTOR
By Marks & Clerk
ATTys.

Patented Nov. 8, 1932

1,887,461

UNITED STATES PATENT OFFICE

ERIC DOUGLAS TOBIAS NORRIS, OF HOLLINWOOD, ENGLAND, ASSIGNOR TO FERRANTI INC., OF NEW YORK, N. Y.

LIGHTNING OR SURGE ABSORBER

Application filed October 19, 1929, Serial No. 400,956, and in Great Britain December 6, 1928.

This invention relates to lightning or surge absorbers of the type embodying a primary element comprising a winding for connection in series with the line and a metallic element associated therewith.

We have found a very serious difficulty arises in connection with such devices in that the line current through the line winding under normal operating conditions (e. g. at 25 or 50 cycles per second periodicity) sets up eddy current losses in the associated metallic element.

For the heavier currents these losses become most serious and are difficult and expensive to dissipate.

The present invention has for its object the elimination or reduction of these losses.

The invention consists briefly in a lightning or surge absorber of the type embodying a winding for connection in series with the line subject to the surges or lightning waves associated with a metallic element including an insulated thin sheet of electrically conducting material inserted between the line winding and the said associated metallic element.

The invention further consists in a lightning or surge absorber of the type embodying a winding for connection in series with the line subject to the surges or lightning waves associated with a metallic element including an insulated thin sheet of electrically conducting material inserted between the line winding and the said associated metallic element insulated lightly from the latter although highly insulated from the winding.

The invention further consists in a lightning or surge absorber as set forth above wherein said thin sheet is flat and is radially slit.

The invention further consists in a lightning or surge absorber as set forth above wherein said thin sheet is cylindrical and is longitudinally slit.

Referring to the accompanying diagrams:

Figure 1:
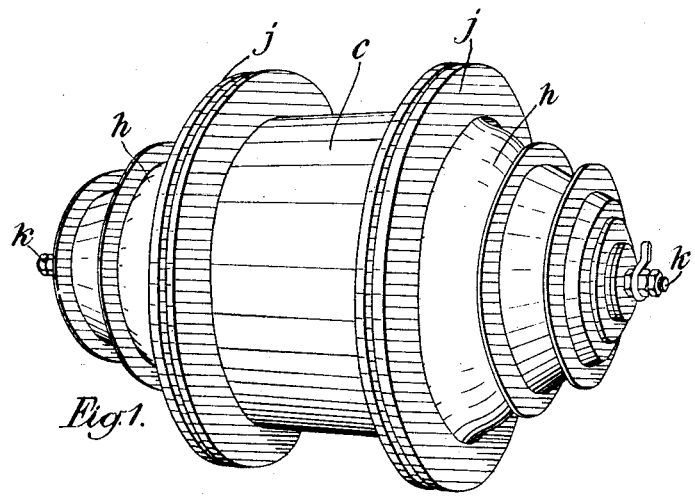
Figure 1 is a perspective view of a typical cylindrical surge absorber.
Figure 2:
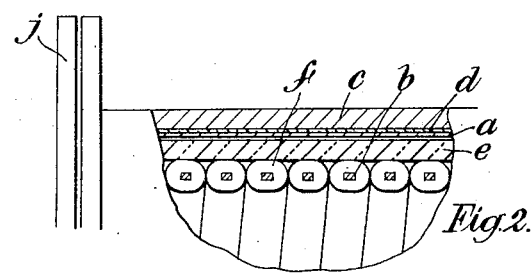
Figure 2 is an enlarged view of a portion thereof partly in section.
Figure 3:
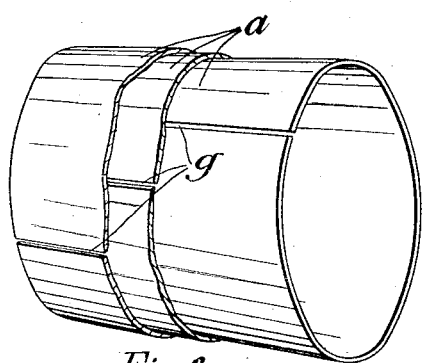
Figure 3 is a perspective view of a plurality of metal sheaths one only of which is embodied in the form illustrated in Figure 2.

In carrying the invention into effect in one convenient form illustrated in Figures 2 and 3 by way of example as applied to the usual cylindrical form of surge absorber (Figure 1) embodying a cylindrical metallic element $c$ acting as an "energy dissipator", we provide a cylinder $a$ longitudinally slit at $g$ (Figure 3) and thin conducting magnetic or nonmagnetic material between the line coils $b$ and the energy dissipator $c$. The energy dissipator is a cylinder of electrical conducting material such, for example, as cast iron and this cylinder acts as a single short-circuiting secondary transformer winding in conjunction with the winding $b$ which extends throughout the length thereof. Eddy currents also are normally induced in the energy dissipator $c$ by the magnetic field produced by currents in the winding $b$.

The sheet $a$ is conveniently formed of thin stalloy or silicon iron such as is employed in modern transformer cores and although highly insulated from the winding $b$ as shown may be but lightly insulated from the energy dissipator $c$. Alternatively, a plurality of such cylinders $a$ slit at $g$ is employed, the individual cylinders being lightly insulated from one another for example by the usual oxide coating to inhibit the passage of eddy currents from one to the other. With such arrangement, which is illustrated diagrammatically in Figure 3, flux is divided between the various sheets and the resulting loss is very much reduced.

In Figure 1 the energy dissipator $c$ is represented as formed with two end flanges, (flanges not shown) of conical members of insulating material $h$ being clamped between the rings $j$ and the end flanges of the member $c$. The terminal ends of the line coils are indicated at $k$.

Only one conducting sheet *a* is provided in the form illustrated in Figs. 2 and 3.

Figure 4:
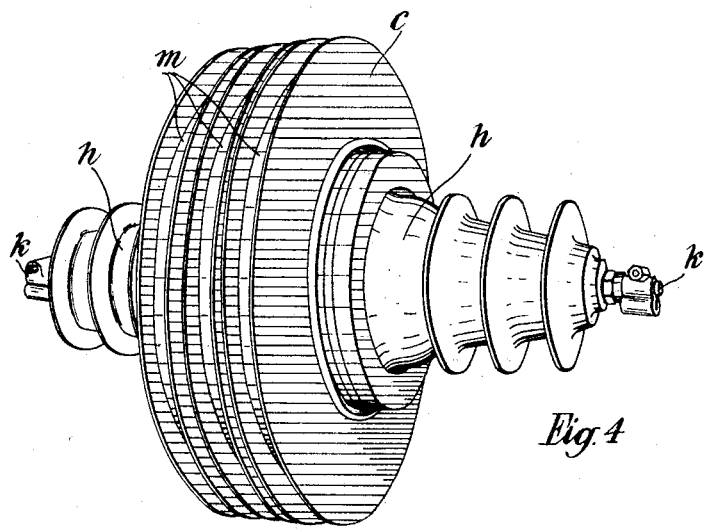
Figure 4 is a perspective view of a typical surge absorber of the flat form.
Figures 5, 6:
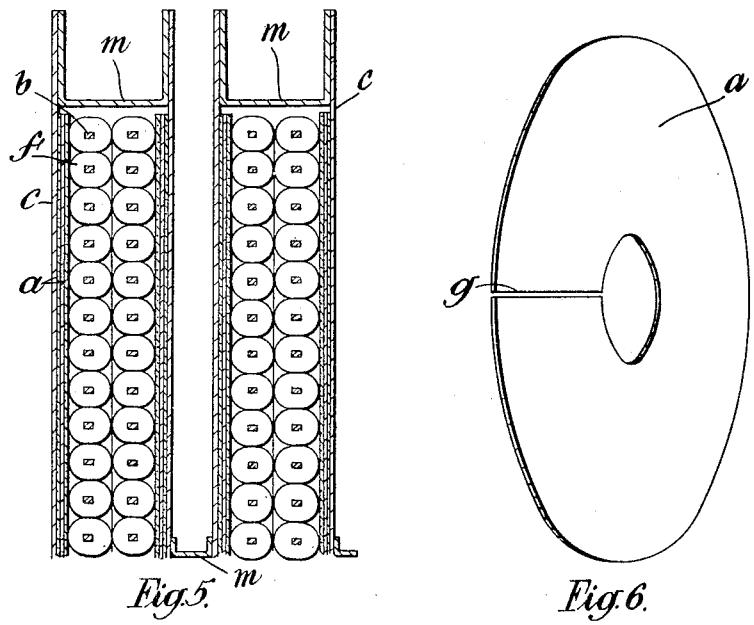
Figure 5 is an enlarged longitudinal sectional view of a portion thereof.
Figure 6 is a perspective view of one of the metal discs employed in Figure 5.

In applying the invention in one convenient way to a surge absorber of flat form (as distinct from the cylindrical form illustrated in Figures 1, 2 and 3) we provide, as is illustrated in Figure 4, an energy dissipator casing *c* formed of metal discs welded to U section rings *m* (Figure 5).

We provide as shown in Figure 5 three flat sheets of conducting magnetic or non-magnetic material *a* at each end of each section of the line winding *b* between the winding and the associated metallic element *c*. These discs may be slit radially as shown in Figure 6 so as not to form short circuited turns. These discs are insulated from the coil *b* by insulating material *f* and are lightly insulated from one another and from the casing *c*, e. g. as are the laminæ used for transformer cores.

The present invention is applicable to any type of surge absorber or lightning arrester which includes a line coil contained in a case or otherwise associated with an energy dissipating metallic element, irrespective of whether the said element acts to dissipate energy in the form of heat by the circulation of induced currents therein or acts as one electrode of an electrostatic condenser of large capacity (of which the other electrode is usually the line winding itself).

I claim:

1. A lightning or surge absorber of the type embodying a winding for connection in series with the line subject to the surges or lightning waves associated with a metallic element including an insulated thin sheet of electrically conducting material inserted between the line winding and the said associated metallic element and serving to eliminate or reduce eddy currents in said metallic element.

2. A lightning or surge absorber of the type embodying a winding for connection in series with the line subject to the surges or lightning waves associated with a metallic element including an insulated thin sheet of electrically conducting material inserted between the line winding and the said associated metallic element insulated lightly from the latter although highly insulated from the winding and serving to eliminate or reduce eddy currents in said metallic element.

3. A lightning or surge absorber as claimed in claim 1 wherein said thin sheet is flat and is radially slit.

4. A lightning or surge absorber as claimed in claim 1 wherein said thin sheet is cylindrical and is longitudinally slit.

In testimony whereof I have signed my name to this specification.

ERIC DOUGLAS TOBIAS NORRIS.